(12) United States Patent
Wu et al.

(10) Patent No.: US 7,471,841 B2
(45) Date of Patent: Dec. 30, 2008

(54) ADAPTIVE BREAKPOINT FOR HYBRID VARIABLE LENGTH CODING

(75) Inventors: Fang Wu, Pleasanton, CA (US); Wen-hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 11/069,620

(22) Filed: Feb. 28, 2005

(65) Prior Publication Data

US 2005/0276499 A1    Dec. 15, 2005

Related U.S. Application Data

(63) Continuation-in-part of application No. 10/898,654, filed on Jul. 22, 2004, which is a continuation-in-part of application No. 10/869,229, filed on Jun. 15, 2004.

(51) Int. Cl.
*G06K 9/36* (2006.01)
*H03M 7/34* (2006.01)

(52) U.S. Cl. .......................................... 382/245; 341/51

(58) Field of Classification Search ................. 382/245; 341/51
See application file for complete search history.

(56) References Cited

U.S. PATENT DOCUMENTS

| | | | | |
|---|---|---|---|---|
| 4,420,771 A | * | 12/1983 | Pirsch | 341/56 |
| 4,698,672 A | | 10/1987 | Chen et al. | 358/136 |
| 4,706,265 A | | 11/1987 | Furukawa | 375/122 |
| 4,725,815 A | * | 2/1988 | Mitchell et al. | 341/67 |
| 4,813,056 A | | 3/1989 | Fedele | 375/27 |
| 4,821,119 A | | 4/1989 | Gharavi | 375/240.16 |

(Continued)

FOREIGN PATENT DOCUMENTS

EP    0 266 049 A2    5/1988

(Continued)

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; Inventek

(57) ABSTRACT

A method, a carrier medium, and an apparatus to process a plurality of ordered series of quantized coefficients of a block of an image to reduce the amount of data used to represent the image. The method includes establishing a breakpoint along the ordering of the series to define a first contiguous region and a second contiguous region, such that clusters of consecutive signals of non-zero values occur mostly in the first contiguous region. Establishing the breakpoint uses statistics calculated from at least a subset of the plurality, the statistics being of where, along the ordering of the plurality of the series, coefficients of any non-zero value occur in clusters of consecutive non-zero coefficients. For each series in the plurality, the signals in the first region are encoded using a first region encoding method, and the signals in the second region are encoded using a second region encoding method.

25 Claims, 3 Drawing Sheets

U.S. PATENT DOCUMENTS

| | | | |
|---|---|---|---|
| 4,845,560 A | 7/1989 | Kondo et al. | 358/133 |
| 4,858,017 A | 8/1989 | Torbey | 358/426 |
| 4,920,426 A | 4/1990 | Hatori et al. | 358/433 |
| 4,922,510 A | 5/1990 | Brusewitz | 375/122 |
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,109,451 A * | 4/1992 | Aono et al. | 382/166 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,253,058 A * | 10/1993 | Gharavi | 375/240.12 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,742,342 A * | 4/1998 | Jung | 375/240.03 |
| 5,751,232 A | 5/1998 | Inoue et al. | 341/63 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,215,424 B1 * | 4/2001 | Cooper | 341/67 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 2004/0228540 A1 | 11/2004 | Chen et al. | 382/246 |

FOREIGN PATENT DOCUMENTS

| | | |
|---|---|---|
| WO | WO 93/18616 | 9/1993 |
| WO | WO 03/090421 | 10/2003 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California Micro project, available on http://www.ucop.edu/research/micro/97_98/97_193.pdf, Retrieved Dec. 16, 2002.

F.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/, Retrieved Dec. 18, 2002.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

* cited by examiner

ADAPTIVE BREAKPOINT FOR HYBRID VARIABLE LENGTH CODING

RELATED PATENT APPLICATIONS

The present invention is a continuation-in-part of U.S. patent application Ser. No. 10/898,654 to inventors Chen et al., filed Jul. 22, 2004 and titled "AN EXTENDED HYBRID VARIABLE LENGTH CODING METHOD FOR LOW BIT RATE VIDEO CODING," assigned to the assignee of the present invention, and having. U.S. patent application Ser. No. 10/898,654 is incorporated herein by reference, except for any material incorporated by reference in U.S. patent application Ser. No. 10/898,654 and not explicitly incorporated by reference in the present disclosure. The methods described in U.S. patent application Ser. No. 10/898,654 are each and collectively called the "Extended Hybrid VLC Method" herein.

U.S. patent application Ser. No. 10/898,654 is a continuation in part of, and thus the present invention is also related to U.S. patent application Ser. No. 10/869,229 to inventors Chen et al., filed Jun. 15, 2004 and titled "A HYBRID VARIABLE LENGTH CODING METHOD FOR LOW BIT RATE VIDEO CODING," assigned to the assignee of the present invention, and having. U.S. patent application Ser. No. 10/869,229 is incorporated herein by reference, except for any material incorporated by reference in U.S. patent application Ser. No. 10/869,229 and not explicitly incorporated by reference in the present disclosure. The methods described in U.S. patent application Ser. No. 10/869,229 are each and collectively called the "Basic Hybrid VLC Method" herein.

The present invention is related to U.S. patent application Ser. No. 10/922,508 to inventors Toebes, et al., filed Aug. 18, 2004, titled "TWO-DIMENSIONAL VARIABLE LENGTH CODING OF RUNS OF ZERO AND NON-ZERO TRANSFORM COEFFICIENTS FOR IMAGE COMPRESSION," assigned to the assignee of the present invention, and having. Incorporated by reference U.S. patent application Ser. No. 10/922,508, except for any material incorporated by reference in U.S. patent application Ser. No. 10/922,508 and not explicitly incorporated by reference in the present disclosure. The methods described in U.S. patent application Ser. No. 10/922,508 are each and collectively called the "2-D Non-Zero/Zero Cluster Coding Method" herein.

The present invention is also related to U.S. patent application Ser. No. 10/922,507 to inventors Chen, et al., filed Aug. 18, 2004, titled "VIDEO CODING USING MULTI-DIMENSIONAL AMPLITUDE CODING AND 2-D NON-ZERO/ZERO CLUSTER POSITION CODING," assigned to the assignee of the present invention, and having. U.S. patent application Ser. No. 10/922,507 is incorporated herein by reference, except for any material incorporated by reference in U.S. patent application Ser. No. 10/922,507 and not explicitly incorporated by reference in the present disclosure. The methods described in U.S. patent application Ser. No. 10/922,507 are each and collectively called the "Basic Multi-Dimensional Amplitude Coding Method" herein.

The present invention is also related to concurrently filed U.S. patent application Ser. No. 11/069,622 to inventors Chen, et al., filed Feb. 28, 2005, titled "AMPLITUDE CODING FOR CLUSTERED TRANSFORM COEFFICIENTS," assigned to the assignee of the present invention, and having. U.S. patent application Ser. No. 11/069,622 is incorporated herein by reference, except for any material incorporated by reference in U.S. patent application Ser. No. 11/069,622 and not explicitly incorporated by reference in the present disclosure. The methods described in U.S. patent application Ser. No. 11/069,622 are each and collectively called the "Multi-Table Amplitude Coding Method" herein.

The present invention is also related to concurrently filed U.S. patent application Ser. No. 11/069,621 to inventors Chen, et al., filed Feb. 28, 2005, titled "JOINT AMPLITUDE AND POSITION CODING FOR PHOTOGRAPHIC IMAGE AND VIDEO CODING," assigned to the assignee of the present invention, and having. Incorporated by reference U.S. patent application Ser. No. 11/069,621, except for any material incorporated by reference in U.S. patent application Ser. No. 11/069,621 and not explicitly incorporated by reference in the present disclosure. The methods described in U.S. patent application Ser. No. 11/069,621 are each and collectively called the "Joint Position and Amplitude Coding Method" herein.

BACKGROUND

The present invention is related to image compression and video coding, in particular to variable length coding of an ordered series of quantized transform coefficients of a transform of a block of image data.

Common transform coding methods, such as JPEG, MPEG1, MPEG2, ITU-T-261, etc., include variable length coding as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a variable length coding method such that more likely-to-occur coefficient amplitude values or sequences of coefficient amplitude values are encoded by longer codeword than less likely-to-occur coefficient or coefficient sequences.

Two-dimensional variable length coding (2D-VLC) according to a 2D-VLC table is commonly used. In traditional 2D-VLC, statistics are collected or assumed of events that include a run of consecutive zero-valued coefficients followed by a single non-zero amplitude coefficient that follows the run length. The ordering of the series of quantized transform coefficients is along a pre-selected path, e.g., a zig-zag path, in the two-dimensional path of the transform. Thus, in a typical implementation, a two-dimensional table consisting of the ending amplitude and the run-length of the preceding consecutive zero-valued coefficients is constructed and variable length codes, such as optimal Huffman codes or arithmetic codes, are assigned according to the assumed or measured statistics to form the 2D-VLC table for the subsequent encoding process. Shorter code lengths are used for the more likely-to-occur, e.g., more frequently occurring events. Interframe and intraframe images typically have different 2D-VLC tables. The DC component is typically separately encoded. Furthermore, the 2D-VLC table may be truncated so that the least frequently occurring events use an escape code followed by a fixed length code. A special "EOB" code is used to indicate the end of the block when all remaining coefficients are zero.

Because of the widespread use of image coding, many patents have been issued on different forms of VLC. U.S. Pat. No. 4,698,672 issued Oct. 6, 1987 to Wen-hsiung Chen, one of the inventors of the present invention, for example, described one form of a two-dimensional variable length coding method.

In coding, there is likely to be a region in the lower frequencies in which the quantized non-zero coefficients are likely to form clusters, there is also likely to be another, high-frequency region where the non-zero-valued coefficients are likely to be scattered amongst zero-valued coefficients. With these observation in mind, the Basic Hybrid VLC Method of above-mentioned incorporated by reference U.S. patent application Ser. No. 10/869,229 to inventors Chen et al. was developed to encode the position and amplitude of quantized transform coefficients separately and takes advantage of the nature of the distribution of the transform coefficients in the low frequency and high frequency regions. U.S. patent application Ser. No. 10/869,229 is the parent to the present invention. The Basic Hybrid VLC Method includes establishing a breakpoint along the path to define two regions, e.g., a low frequency region and a high frequency region. A first-region coding method is used to encode the quantized coefficients in the low-frequency region, and a second-region coding method is used to encode the coefficients in the second region. In general, the first region coding method includes a method to identify and encode the relative positions and runlength of clusters of non-zero-valued coefficients in the first region, and any intervening runs of zero-valued coefficients in the first region, and a method to encode the amplitudes of the non-zero-valued coefficients in the clusters. The encoding methods further include encoding the signs of the coefficients.

In the Basic Hybrid VLC Method, the positions representing the clusters of non-zero-valued coefficients and the intervening runs of zero-valued coefficients in the low frequency region are coded using two independent one-dimensional variable length coding schemes. The position representing the runs of zero-valued coefficients terminating with a single non-zero coefficient (including the run of zero) in the high frequency region is coded using a third variable length coding scheme. Following the coding of positions, a separate variable length coding is then used to code the amplitude of each non-zero-valued coefficient.

The Extended Hybrid VLC Method of incorporated by reference U.S. patent application Ser. No. 10/898,654 provides an alternative coding method for the high frequency region by taking advantage of the very few amplitude values in the high frequency region, especially, for example, for low bit rate and interframe applications.

An observation was made that an improvement in coding efficiency can further be achieved by pairing the consecutive non-zero-valued coefficients and zero-valued coefficients as a pair and applying a single two-dimensional table to code the pair to jointly encode the relative position and runlength of the cluster of non-zero-valued coefficients and the runlength of any preceding run of zero-valued coefficients in the first region. With this observation, the 2-D Non-Zero/Zero Cluster Coding Method of above-mentioned incorporated by reference U.S. patent application Ser. No. 10/922,508 was introduced to improve the coding efficiency, for example for the low frequency region, and in other embodiments for more than the low frequency region.

The Basic Multi-Dimensional Amplitude Coding Method of above-mentioned incorporated by reference U.S. patent application Ser. No. 10/922,507 and the Multi-Table Amplitude Coding Method of above-mentioned incorporated by reference U.S. patent application Ser. No. 11/069,622 introduce a method of encoding the amplitudes of the non-zero coefficients in the clusters of the first region to further improve the coding efficiency.

The Joint Position and Amplitude Coding Method of above-mentioned incorporated by reference U.S. patent application Ser. No. 11/069,621 describes further improving the encoding of the coefficients in the first region by jointly encoding the relative positions and runlengths of the non-zero-valued coefficients in the clusters of non-zero coefficients and the runlength of any intervening zero-valued coefficients with the amplitudes of the non-zero valued coefficients in the cluster.

In each of these methods, a breakpoint is defined as the boundary between the low frequency and high frequency regions. The optimal breakpoint within the frequency spectrum of the transform used in the encoding varies from block to block and picture to picture. Pre-defined breakpoints may be used by pre-determining typical breakpoints by running experiments collecting statistics on a set of typical block coefficients. Typically, different breakpoints are determined for high resolution or high quality still image coding vs. low resolution or low quality still image coding; intraframe coding vs. interframe coding; high bit rate coding methods vs. low bit rate coding methods; DCT-based transform coding methods vs. non-DCT transform coding methods; and so forth.

Although a predetermined breakpoint can provide a satisfactory coding performance it is by no means optimum. The results of various experiments indicated that the performance of a hybrid coder can further be improved by using an optimal breakpoint. The improvement can be as large as 25% of the improvement that has been achieved using a pre-determined breakpoint.

Thus there is a need in the art for a method to determine the optimal or near optimal breakpoint for the purpose of defining a first (low-frequency) region and a second (high frequency) region for hybrid coding according to one or another of the above-mentioned hybrid coding methods described in the patent application of the RELATED PATENT APPLICATIONS section.

One method to find the optimal breakpoint, denoted y by N herein, is to conduct exhaustive search over all possible breakpoints, that is, for example, to encode the picture 63 times for an 8×8 block transform, trying different breakpoints, i.e., trying N=1, 2, . . . , 63. Comparing the length of the resulting codewords for the block provides the best N and also the codewords for such an optimal N. Such an approach is very time consuming, and thus not likely to be practical.

Thus there is a need for a more efficient method to determine the optimal or near optimal breakpoint.

SUMMARY

Described herein are a method, a carrier medium, and an apparatus to process a plurality of ordered series of digital signals, each signal having an amplitude from a finite set of amplitudes consisting of the most likely-to-occur amplitude and at least one other amplitude. The processing is to reduce the amount of data used to represent the plurality of series and to form codewords such that the more likely-to-occur sequences of values of digital signals in each series are represented by relatively short codewords and the less likely-to-occur sequences of values of digital signals in each series are represented by relatively long codewords.

One embodiment of the method includes establishing a breakpoint along the ordering of the series to define a first contiguous region and a second contiguous region, such that clusters of consecutive signals of any value other than the most likely-to-occur value occur mostly in the first contiguous region, the establishing using statistics calculated from at least a subset of the plurality, the statistics being of where along the ordering of the plurality of the series signals of any value other than the most likely-to-occur value occur in clusters of consecutive signals of any value other than the most likely-to-occur value. For each series in the plurality, the signals in the first region are encoded using a first region encoding method, and the signals in the second region are encoded using a second region encoding method. The first region and second region encoding methods include variable length codes such that relatively short codewords are formed to represent sequences of values that are relatively more likely-to-occur, and relatively long codewords are formed to represent sequences of values that are relatively less likely-to-occur.

In the description, each series of digital signals is a series of quantized coefficients of a transformed block of image data of an image, the transform such that the most likely-to-occur amplitude is 0.

In one version, the series is divided into more than two regions by the breakpoint and an additional breakpoint for each region in addition to the second region, and in this version, the signals occurring in each additional region defined by the corresponding additional breakpoint are encoded using a corresponding coding method different from the coding methods used in other regions.

In some embodiments, the establishing of the breakpoint includes counting, for each point along the ordering, the number of series in which the coefficient at the point is in a cluster.

In one embodiment, the establishing of the breakpoint includes determining a threshold point such that most coefficients that are in a cluster occur at a point prior to the threshold point, and searching for a near optimal breakpoint only up to the threshold point. As an example, the threshold point is the particular point along the ordering where the count of the number of series that have a coefficient at the point falls below a pre-selected fraction of the total number of series.

In one version the establishing of the near optimal breakpoint includes determining the length of the coded data for the plurality of series for breakpoints up to the threshold point, and selecting the breakpoint that produced the shortest coded data.

In another version, the establishing of the breakpoint includes determining the point along the ordering up to the threshold point wherein the slope in the count of the number of non-zero coefficients that are in a cluster is the maximum.

Other aspects, features, and variations will be clear from the Detailed Description and Claims.

DETAILED DESCRIPTION

Presented herein are a method, an apparatus, and a carrier medium to find a breakpoint denoted N along the path of the ordering of an ordered series of quantized coefficients of a block of image data to identify a first, e.g., low-frequency region and a second, e.g., high frequency region.

Figure 1:
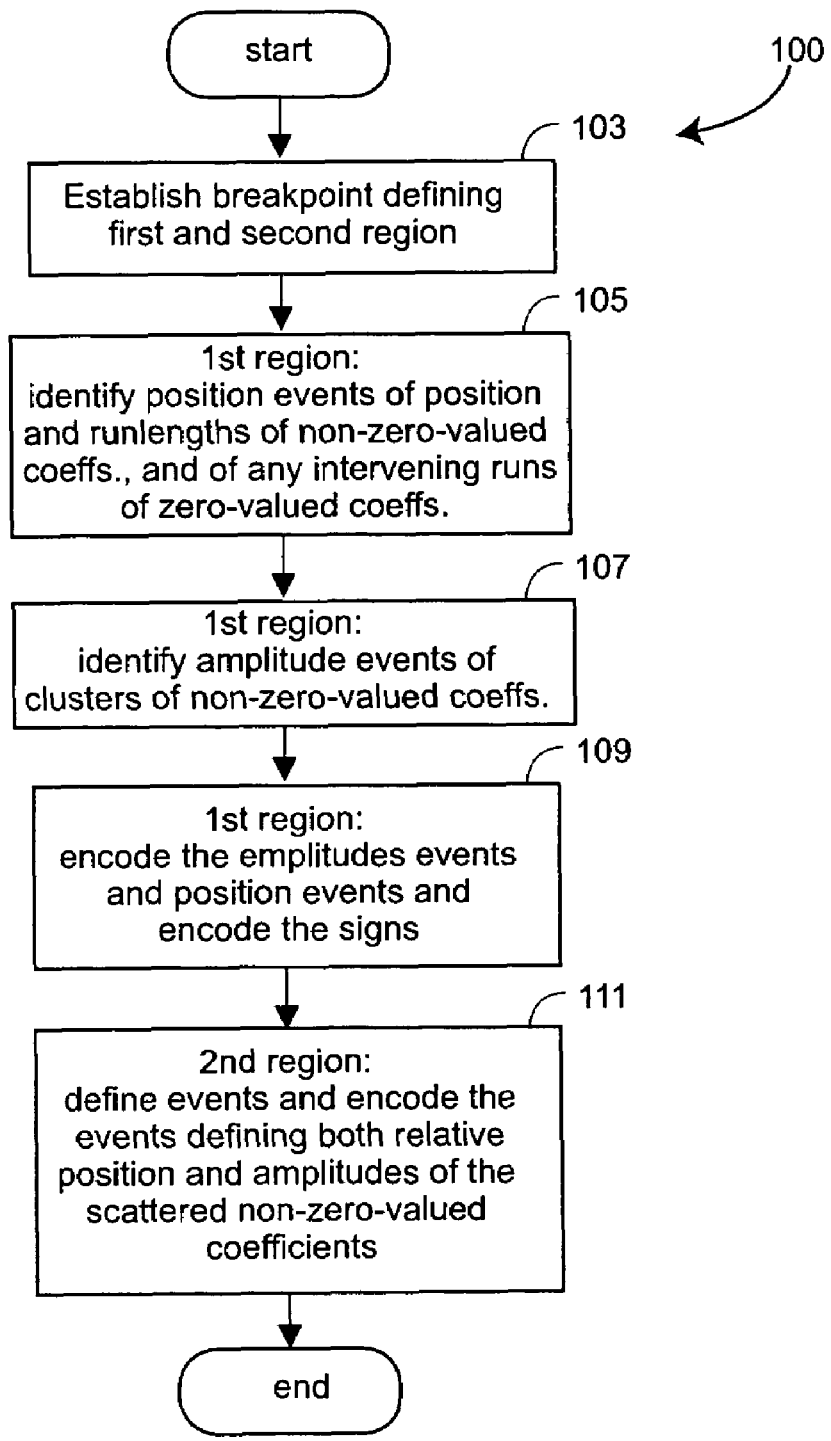
FIG. 1 shows a flow chart of a typical hybrid coding method that includes establishing a breakpoint. In one embodiment, the breakpoint establishing method uses an embodiment of the present invention.

FIG. 1 shows one embodiment 100 of a hybrid coding method using the techniques of one or more of the Basic Hybrid VLC Method, the Extended Hybrid VLC Method, the 2-D Non-Zero/Zero Cluster Coding Method, the Basic Multi-Dimensional Amplitude Coding Method, the Multi-Table Amplitude Coding Method, and the Joint Position and Amplitude Coding Method.

In 103, the breakpoint N along the path of the ordering of the ordered series of quantized coefficients of the block of image data is established to identify a first, e.g., low-frequency region and a second, e.g., high frequency region Once the breakpoint is established, in 105, position events defining the relative positions and runlengths of the clusters of non-zero-valued coefficients and of any intervening runs of zero-valued coefficients are identified.

In 107, amplitude events defining the amplitudes of the non-zero-valued coefficients in the clusters also are identified.

In 109, the position events and the amplitude events are encoded according to one or more of the above-described hybrid coding methods. In all but the Joint Position and Amplitude Coding Method, the position events are encoded using a relative position encoding method, and the amplitude events are encoded using an amplitude coding method. In the Joint Position and Amplitude Coding Method, the position events and amplitude events for at least some of the clusters are jointly coded.

In 111, the quantized coefficients in the second region are encoded using a second region coding method. The second region coding method defines the relative positions of the typically scattered non-zero-valued coefficients and encodes the relative positions and the amplitude of the non-zero coefficients.

The present invention deals with block 103 of establishing the breakpoint. While in this description, the invention is described in terms of transform coefficients, the invention in general relates to encoding an ordered series of digital signals that each has an amplitude from a finite set of amplitude values. Each signal may also have a sign, i.e., be it either positive or negative. The set of amplitude values include one most likely-to-occur amplitude and at least one other amplitude. The application discussed herein is for the ordered series of signals being the ordered set of quantized coefficient values of a block of image data after transformation by a transform such as the DCT or some other common transform, after quantization to a finite number of values, and after ordering along a predefined path, e.g., a zigzag path. The ordering of the series is typically in order of increasing spatial frequency. The most likely-to-occur value, e.g., the most frequently occurring value is typically 0, and in some cases, 1.

Embodiments will be described herein for the case of each image being partitioned into 8 by 8 blocks, then each block, e.g., after motion compensation and interframe subtraction for the case of interframe motion compensated coding, or directly for the case of independent frames or of still frames, being transformed, e.g., by a DCT. The method, carrier medium, and apparatus described herein are not restricted to such block sizes or to the DCT. Other block sizes or transforms may be used.

The method described herein describes determining an image dependent breakpoint. When an image-dependent breakpoint is used, a code indicating the breakpoint is sent to the decoder with each set of encoded coefficients or images. The same method can be used for individual video frame in a video sequence.

One method to find the optimal breakpoint N is to encode the picture 63 times for an 8×8 block transform, trying different breakpoints, i.e., trying N=1, 2, . . . , 63. Comparing the length of the resulting codewords for the block provides the best N and also the codewords for such an optimal N. Such an approach is very time consuming, and thus not likely to be practical. The case of N=63 means that the second region is a null region such that there is only one non-null region—the first region—to apply the VLC coding method, and the coding method is the first region coding method. Similarly, the case of N=0 means that the second region is a null region such that there is only one non-null region—the first region—to apply the VLC coding method, and the coding method is the second region coding method.

The present invention therefore provides a more practical method to use statistics of a set of coefficients of blocks of image data to find a near-optimal breakpoint. The near optimal break point is used for the hybrid coding method.

After an in-depth examination of the performance of the hybrid coder as a function of breakpoint N and the statistics of the cluster coefficients within the transform block, the authors have found a fast method to determine a near optimal breakpoint N. The fast method includes first finding the boundary that defines a region that has more clustered coefficients than isolated scattered coefficients. Once such a region is determined, the next part of the method includes determining the best breakpoint N within the determined region. The inventors have found that this determines a value of the breakpoint N that is near the optimum.

Finding the boundary that defines the region for clustered coefficients and then restricting the search for the best breakpoint to such a region can significantly reduce the search time for a near optimal breakpoint. Such a boundary for the clustered region can be as low as 0 to 2 for an interframe video picture that has been efficiently motion compensated, or a highly compressed still image. In such a situation, finding the near optimal breakpoint can be reduced to comparing the coding of a series of 3 or 4 coefficients for a relatively small number of possibilities, instead of encoding all 63 coefficients for a large number of possible values of N. The case that the breakpoint is 0 means that there the first region is a null region and that there is one non-null region to apply the VLC coding method, in this case the "second region" coding method.

A series of experiments indicated that the near optimal breakpoint determined by an embodiment of the present invention consistently brings the performance of the hybrid coder to within 0.2% of the performance using the true optimal breakpoint which is obtained by conducting an exhaustive search.

Figure 2:
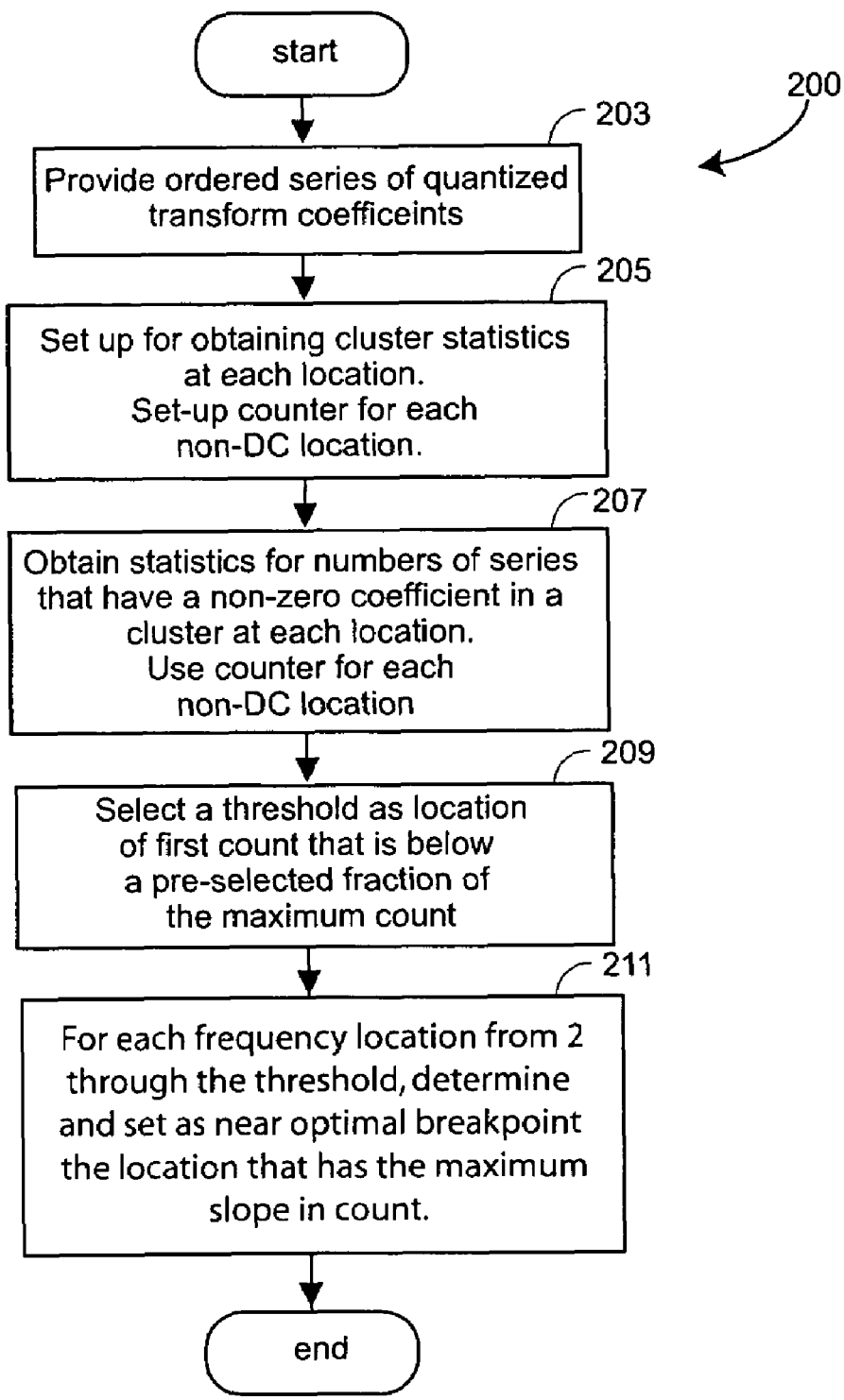
FIG. 2 shows a flow chart of one embodiment of a method of establishing a near optimal breakpoint according to one or more aspects of the present invention.

FIG. 2 shows a flow chart of one method embodiment 200 of determining the near optimal breakpoint. 203 starts with a series of ordered quantized transform coefficients for each image block, e.g., each 8×8 image block, with the ordering obtained by traversing the transformed quantized image block along a pre-determined, e.g., zig-zag path. For example, for a color image of 704 by 480 pixels of a luminance component and two chrominance components, there are 5280×3=15840 series of 64 ordered quantized transform coefficients array. Ignoring the DC coefficients, each series has 63 coefficients.

Statistics are obtained of each frequency for all the sets of 63 coefficients for whether or not a cluster exists at a particular frequency. For this, in 205, a set of 63 counters is set up, one counter for each frequency, e.g., as an array length 63, with each array location being for a count at a particular frequency. For example, the set up can be written in C code as: int counter [63] in which counter [5] denotes the counter of the number of clusters in position 6 of the zig-zag path, where position 0 is the first AC component.

In 207, the number of non-zero coefficients that are in a cluster at each frequency location in the sets of series of coefficients is counted. For this, every non-zero-valued coefficient is treated the same. For each location, the count for that location is incremented by 1 if a non-zero coefficient is encountered that is in a cluster. In one embodiment, ascertaining if a particular non-zero coefficient location is in a cluster is according to whether or not the following location's coefficient is non-zero. Thus, a single non-zero coefficient whose next coefficient in the same series of coefficients is zero-valued is not in a cluster. Suppose for example that for a particular series of coefficients, locations 4 and 5 each contain a non-zero coefficient, and location 6 is zero-valued. Then location 4's coefficient is regarded as being in a cluster, and the count at position 4 would be incremented by 1 for this location 4, while location 5's coefficient is not considered to be in a cluster. As a further example, suppose that for a particular series, locations 4, 5, and 6 each have a non-zero-valued coefficient, while location 7 has a zero-valued coefficient. Then location 4's coefficient is ascertained as being in a cluster because the following coefficient is non-zero, and the count at position 4 would be incremented by 1 for this location 4. Similarly, location 5's coefficient is ascertained to be in a cluster, and the count at position 5 would be incremented by 1. Location 6's non-zero-valued coefficient, however, is not considered to be in a cluster because the next coefficient at location 7 is zero-valued.

In this manner, step 207 is repeated for the complete set of series that make up the entire picture, e.g., for the 15840 series of 63 non-DC quantized transform coefficients for a color image of 704 by 480 pixels of a luminance component and two chrominance components.

Step 209 selects a threshold as the location of the first count that is below a pre-selected fraction of the maximum count. In one embodiment, the pre-selected fraction is 1/the number of frequencies. For the particular version of such an embodiment for 8 by 8 blocks, the fraction is thus 1/63. So for a color image of three color components of 704 by 480, the first count starting with the lowest frequency location's count that is less than 15840/63, i.e., the location of the first count that is less than or equal to 251 is used as the threshold for the maximum value of the breakpoint.

This is the same as dividing each count by the total number of series and multiplying by the number of non-zero frequencies in the series, e.g., 63 for 8 by 8 blocks, and comparing to 1. The first counter location that is less than 1 is set to be the threshold for finding the near optimal breakpoint.

In step 211, for a frequency location from 2 through the threshold determined in step 209, the location that has the maximum slope in count is set as the near optimal breakpoint. Denoting the counter as counter [i], for i=1 to 63, the, slope is determined as:

slope[$i$]=−(counter[$i$]−counter[$i$−1])/counter[$i$], $i$=2, . . . , 63.

The location i that has the maximum slope amplitude is set to be the value N of the near optimal breakpoint.

Note that variations are possible. In one variation, the threshold location is determined, such a threshold being the position along the series wherein the relative number of blocks in the image that have a coefficient that is in a cluster is first less than a pre-selected fraction of the total number of blocks. A search is then carried out for the optimal breakpoint within the subset of locations up to the threshold. In one version, the search is by comparing the actual code length for encoding the image or a color of the image. In another version, as described above, the location wherein the slope in the number of blocks that have a coefficient that is maximum has the highest magnitude. In yet another version, the location of the largest drop in the relative number of blocks that have a coefficient in a cluster is determined. That is, the near optimal breakpoint is determined as the location i such that (counter[i]−counter[i−1])/maxcount is maximum is determined.

In yet another variation, the search is conducted up to a pre-selected fraction of the maximum number of non-DC coefficients. In one such version, the threshold is pre-defined as the max_location/3, where max_location denotes the number of non-DC coefficients, e.g., 63 for 8 by 8 blocks. In another such version, the threshold is pre-defined as the max_location/2. The search for the near optimal breakpoint is then conducted only up to the threshold.

In yet another embodiment, in the case of color frames, if the color information is not encoded at the same resolution as the intensity (luminance) information, different breakpoints are established for the color information and the luminance information. For example, for a color image of 704 by 480 pixels of a luminance component, the two chrominance components may be encoded as 352 by 480 pixel images. In such a case, for 8 by 8 blocks, there are 5280 luminance blocks, and a luminance image breakpoint is established based on these blocks. A possibly different chrominance image breakpoint is established based on the 2×2640=5280 total chrominance blocks to encode each chrominance image.

Further note that although the present description is in terms of a breakpoint to define a first region where clusters of non-zero values are likely to occur, and a second region where any non-zero coefficients are likely to be scattered, once the first and second regions are established, each such region can be further divided into regions such that the overall ordering may be ultimately divided into more than two regions.

Figure 3:
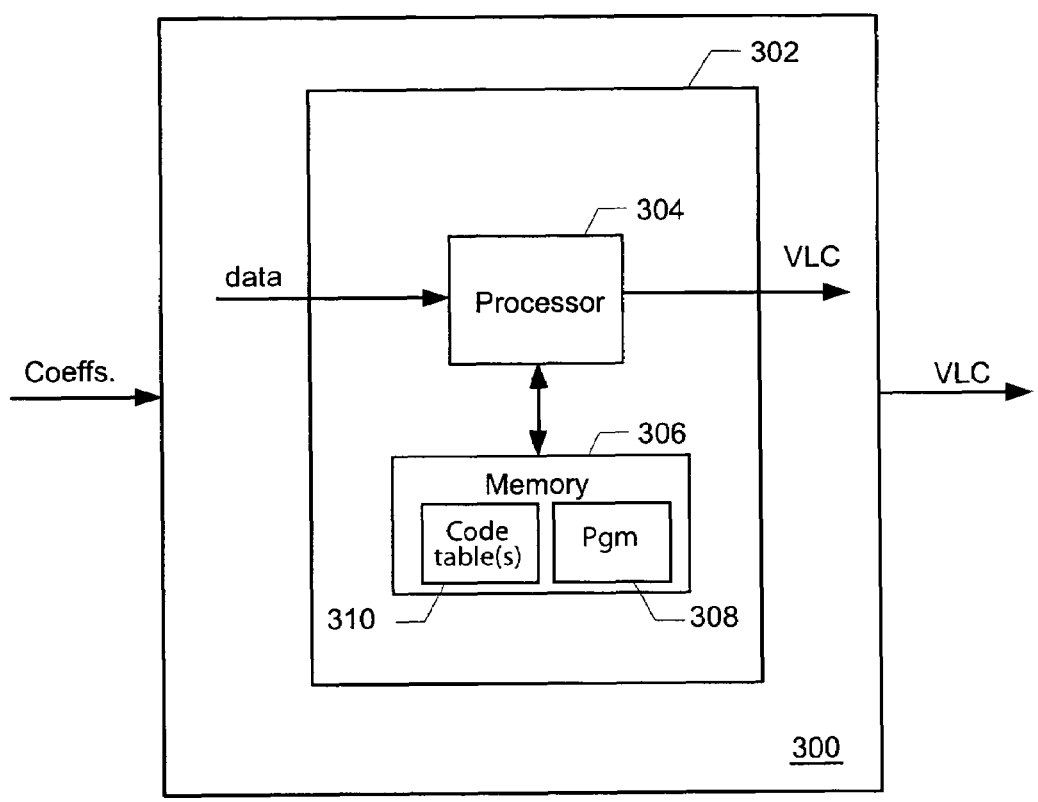
FIG. 3 shows an apparatus that includes an embodiment of the present invention to establish a near optimal breakpoint.

Another aspect of the invention is an apparatus for coding a series of digital signals, e.g., an ordered series of quantized coefficients of a transformed block of image data. FIG. 3 shows an apparatus 300 that includes a processing system 302 that includes one or more processors 304 and a memory 306. A single processor is shown in FIG. 3 and those in the art will appreciate that this may represent several processors. Similarly, a single memory subsystem 306 is shown, and those in the art will appreciate that the memory subsystem may include different elements such as RAM, ROM, and so forth. In addition, the memory subsystem is meant to include any non-volatile memory storage such as a magnetic or optical storage component. A computer program 308 is included and is loaded into the memory 306. Note that at any time, some of the program may be in different parts of the memory subsystem, as will be understood by those in the art. The program 308 includes a computer program to instruct the processor to implement, in different versions, different hybrid coding methods that include the processor accepting as data the ordered coefficients, determining a breakpoint along the ordering of the coefficients to define a first and a second region, and respectively determining and generating the codewords for the coefficients in the first and second region according to a first region coding method and a second region coding method. The determining of the breakpoint is according to one or more aspects of the present invention. The apparatus 300 further includes in the memory subsystem 306 a coding data structure 310 that provides the codewords for sets of one or more coefficients as described in any one of the first region and second region coding methods described in any of the incorporated by reference material in the patent applications mentioned in the RELATED PATENT APPLICATIONS section above. In one embodiment, the data structure is in the form of the coding tables for the position codes and for the amplitude codes, and for the joint coding functions of the position codes and the amplitude codes.

Note that FIG. 3 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Thus, a method and apparatus, and a carrier medium carrying instructions to instruct a processor or processors to carry out a method, have been described suitable for determining the breakpoint to define a first and second region in an ordered series of quantized transform coefficients of blocks of images as occur in common image compression methods, such that the coefficients in the first region can be encoded using a first region coding method, and the coefficients in the second region can be encoded using a second region coding method.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in a server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of an image encoder. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium"should be taken to include a single medium or multiple media (e.g., in a centralized or distributed database, and/or associated caches and servers) that store the one or more sets of a computer program. The term "carrier medium"shall also be taken to include any medium that is capable of storing, encoding or carrying a set of a computer program for execution by the machine and that cause the machine to perform any one or more of the methodologies of the present invention. A carrier medium may take many forms, including but not limited to, non-volatile media, and/or volatile media. Non-volatile media includes, for example, optical, magnetic disks, and magneto-optical disks. Volatile media includes dynamic memory, such as main memory. For example, the term "carrier medium"shall accordingly be taken to include, but not be limited to, solid-state memories, optical media, and/or magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., a wavelet transform. Also, the transform block size can be different, for example, the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks, or any still imaging compression coding.

Note that variable length coding is sometimes referred to as entropy coding or statistical coding.

Note that in one embodiment for amplitude encoding, 127 possible non-zero values are possible for the coefficients. The invention however is not restricted to any number of possible quantization values.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of processing using hardware that may include one or more processors, the processing being of a plurality of ordered series of digital signals, each signal having a value including an amplitude from a finite set of amplitudes consisting of the most likely-to-occur amplitude and at least one other amplitude, the processing to reduce the amount of data used to represent the plurality of a series of digital signals and to form codewords such that the more likely-to-occur sequences of values of digital signals in each series are represented by relatively short codewords and the less likely to occur sequences of values of digital signals in each series are represented by relatively long codewords, the method comprising:

establishing a breakpoint along the ordering of the series to define a first contiguous region and a second contiguous region, such that clusters of consecutive signals of any value other than the most likely-to-occur value occur mostly in the first contiguous region, the establishing using statistics calculated from at least some of the ordered series of digital signals, the statistics being of where, along the ordering of the plurality of the series, signals of any value other than the most likely-to-occur value occur in clusters of consecutive signals of any value other than the most likely-to-occur value; and for each series in the plurality,
encoding the signals in the first region using a first region encoding method; and
encoding the signals in the second region using a second region encoding method, wherein the first region and second region encoding methods include variable length codes such that relatively short codewords are formed to represent sequences of values that are relatively more likely-to-occur, and relatively long codewords are formed to represent sequences of values that are relatively less likely-to-occur, and wherein in the case that the established breakpoint is such that the second region is a null region, all the quantized coefficients are encoded using the first region encoding method, and in the case that the established breakpoint is such that the first region is a null region, all the coefficients are encoded using the second region encoding method.

2. A method as recited in claim 1,
wherein each series of digital signals is a series of quantized coefficients of a transformed block of image data of an image, and wherein the transform of the transformed block of image data of the image is such that the most-likely-to-occur amplitude is 0.

3. A method as recited in claim 2, wherein the series is divided into more than two regions by the breakpoint and an additional breakpoint for each region in addition to the second region, the method farther comprising:

encoding the signals occurring in each additional regions defined by the corresponding additional breakpoint, the encoding using a coding method different from the coding methods used in other regions.

4. A method of processing using hardware that may include one or more processors, the processing being of a plurality of ordered series of quantized coefficients of respective transformed blocks of image data of an image, each quantized coefficient having a value including an amplitude from a finite set of amplitudes, including a most-likely-to-occur amplitude being 0, and at least one other amplitude, the processing to reduce the amount of data used to represent the plurality of series quantized coefficients and to form codewords such that the more likely-to-occur sequences of values of quantized coefficients in each series are represented by relatively short codewords and the less likely to occur sequences of values of quantized coefficients in each series are represented by relatively long codewords, the method comprising:

establishing a breakpoint along the ordering of the series to define a first contiguous region and a second contiguous region, such that clusters of consecutive signals of any non-zero values occur mostly in the first contiguous region, the establishing using statistics calculated from at least some of the ordered series of quantized coefficients, the statistics being of where, along the ordering of the plurality of the series, signals of any non-zero value occur in clusters of quantized coefficients of any non-zero value; and for each series in the plurality,
encoding the signals in the first region using a first region encoding method; and
encoding the signals in the second region using a second region encoding method, wherein the first region and second region encoding methods include variable length codes such that relatively short codewords are formed to represent sequences of values of quantized coefficients that are relatively more likely-to-occur, and relatively long codewords are formed to represent sequences of values of quantized coefficients that are relatively less likely-to-occur, and wherein the establishing of the breakpoint includes counting, for each point along the ordering, the number of series in which the coefficient at the point is in a cluster.

5. A method as recited in claim 4,
wherein the establishing of the breakpoint includes determining a threshold point such that most coefficients that are in a cluster occur at a point prior to the threshold point, and searching for a near optimal breakpoint only up to the threshold point.

6. A method as recited in claim 5,
wherein the establishing of the near optimal breakpoint includes determining the length of the coded data for the plurality of series for breakpoints up to the threshold point, and selecting the breakpoint that produced the shortest coded data.

7. A method as recited in claim 5,
wherein the threshold point is the particular point along the ordering where the count of the number of series that have a coefficient at the point falls below a pre-selected fraction of the total number of series.

8. A method as recited in claim 7,
wherein the pre-selected fraction is 1/(the number of non-DC coefficients in each series).

9. A method as recited in claim 5,
wherein the establishing of the breakpoint includes determining the point along the ordering up to the threshold point wherein the slope in the count of the number of non-zero coefficients that are in a cluster is maximum.

10. A method as recited in claim 4,
wherein the establishing of the breakpoint includes determining the point along the ordering wherein the slope in the count of the number of non-zero coefficients that are in a cluster is maximum.

11. A computer readable hardware storage medium having a computer program coded thereon that when executed by one or more processors cause execution of a method of processing a plurality of ordered series of quantized coefficients of blocks of an image, the coefficients having zero as the most likely-to-occur-amplitude, the processing to reduce the amount of data used to represent the image and to form codewords such that the more likely-to-occur sequences of coefficients in each series are represented by relatively short codewords and the less likely-to-occur sequences of coefficients in each series are represented by relatively long codewords, the method comprising:
establishing a breakpoint along the ordering of the series to define a first contiguous region and a second contiguous region, such that clusters of consecutive non-zero-valued coefficients occur mostly in the first contiguous region, the establishing using statistics calculated from at least some of the ordered series of digital signals, the statistics being of where, along the ordering of the plurality of the series, non-zero-valued coefficients occur in clusters of consecutive non-zero-valued coefficients; and
for each series in the plurality,
encoding the coefficients in the first region using a first region encoding method; and
encoding the coefficients in the second region using a second region encoding method,
wherein the first region and second region encoding methods include variable length codes such that relatively short codewords are formed to represent sequences of values that are relatively more likely-to-occur, and relatively long codewords are formed to represent sequences of values that are relatively less-likely-to occur, and
wherein in the case that the established breakpoint is such that the second region is a null region, all the quantized coefficients are encoded using the first region encoding method, and in the case that the established breakpoint is such that the first region is a null region, all the coefficients are encoded using the second region encoding method.

12. A computer readable hardware storage medium having a computer program coded thereon that when executed by one or more processors cause execution of a method of processing a plurality of ordered series of quantized coefficients of respective transformed blocks of image data of an image, each quantized coefficient having a value including an amplitude from a finite set of amplitudes, including a most-likely-to-occur amplitude being 0, and at least one other amplitude, the processing to reduce the amount of data used to represent the plurality of series quantized coefficients and to form codewords such that the more likely-to-occur sequences of values of quantized coefficients in each series are represented by relatively short codewords and the less likely to occur sequences of values of quantized coefficients in each series are represented by relatively long codewords, the method comprising:
establishing a breakpoint along the ordering of the series to define a first contiguous region and a second contiguous region, such that clusters of consecutive signals of any non-zero values occur mostly in the first contiguous region, the establishing using statistics calculated from at least some of the ordered series of quantized coefficients, the statistics being of where, along the ordering of the plurality of the series, signals of any non-zero value occur in clusters of quantized coefficients of any non-zero value; and
for each series in the plurality,
encoding the signals in the first region using a first region encoding method; and
encoding the signals in the second region using a second region encoding method,
wherein the first region and second region encoding methods include variable length codes such that relatively short codewords are formed to represent sequences of values of quantized coefficients that are relatively more likely-to-occur, and relatively long codewords are formed to represent sequences of values of quantized coefficients that are relatively less likely-to-occur, and
wherein the establishing of the breakpoint includes counting, for each point along the ordering, the number of series in which the coefficient at the point is in a cluster.

13. A computer readable hardware storage medium as recited in claim 12,
wherein the establishing of the breakpoint includes determining a threshold point such that most coefficients that are in a cluster occur at a point prior to the threshold point, and searching for a near optimal breakpoint only up to the threshold point.

14. A computer readable hardware storage medium as recited in claim 13,
wherein the threshold point is the particular point along the ordering where the count of the number of series that have a coefficient at the point falls below a pre-selected fraction of the total number of series.

15. A computer readable hardware storage medium as recited in claim 13,
wherein the establishing of the breakpoint includes determining the point along the ordering up to the threshold point wherein the slope in the count of the number of non-zero coefficients that are in a cluster is maximum.

16. An apparatus for processing a plurality of ordered series of quantized coefficients of transforms of image blocks of an image, each coefficient having a most likely-to-occur amplitude of zero and at least one other amplitude, the processing to reduce the amount of data used to represent the image and to form codewords such that the more likely-to-occur sequences of coefficients in each series are represented by relatively short codewords and the less likely-to-occur sequences of coefficients in each series are represented by relatively long codewords, the apparatus comprising:

means for establishing a breakpoint along the ordering of the series to define a first contiguous region and a second contiguous region, non-zero-valued coefficients occur mostly in the first contiguous region, the establishing using statistics calculated from at least some of the ordered series of quantized coefficients, the statistics being of where, along the ordering of the plurality of the series, non-zero-coefficients signals occur in clusters of non-zero-valued coefficients;

means for encoding the coefficients in the first region of each series in the plurality using a first region encoding method; and means for encoding the coefficients in the second region of each series in the plurality using a second region encoding method, wherein the first region and second region encoding methods include variable length codes such that relatively short codewords are formed to represent sequences of values that are relatively more likely-to-occur, and relatively long codewords are formed to represent sequences of values that are relatively less likely-to-occur.

17. An apparatus as recited in claim 16, wherein the means for establishing of the breakpoint includes counting, for each point along the ordering, the number of series in which the coefficient at the point is in a cluster.

18. An apparatus as recited in claim 17,
wherein the establishing of the breakpoint includes determining a threshold point such that most coefficients that are in a cluster occur at a point prior to the threshold point, and searching for a near optimal breakpoint only up to the threshold point.

19. An apparatus as recited in claim 18,
wherein the threshold point is the particular point along the ordering where the count of the number of series that have a coefficient at the point falls below a pre-selected fraction of the total number of series.

20. An apparatus as recited in claim 18,
wherein the establishing of the breakpoint includes determining the point along the ordering up to the threshold point wherein the slope in the count of the number of non-zero coefficients that are in a cluster is maximum.

21. An apparatus including a processing system, the processing system including at least one processor and at least one storage element, the apparatus to accept a plurality of ordered series of quantized coefficients of blocks of an image, the coefficients having a most likely-to-occur amplitude of zero, the-at least one storage element configured with executable instructions that when executed on the processing system, cause the apparatus to perform a method for processing the plurality of ordered series to reduce the amount of data used to represent the image and to form codewords such that the more likely-to-occur values or sequences of values of coefficients are represented by relatively short codewords and the less likely-to-occur values or sequences of values of coefficients are represented by relatively long codewords, the method comprising:

establishing a breakpoint along the ordering of the series to define a first contiguous region and a second contiguous region, such that clusters of consecutive non-zero-valued coefficients occur mostly in the first contiguous region, the establishing using statistics calculated from at least some of the ordered series of quantized coefficients, the statistics being of where, along the ordering of the plurality of the series non-zero-valued coefficients occur in clusters of consecutive non-zero-valued coefficients; and for each series in the plurality,
encoding the coefficients in the first region using a first region encoding method; and
means for encoding the coefficients in the second region using a second region encoding method, wherein the first region and second region encoding methods include variable length codes such that relatively short codewords are formed to represent sequences of values that are relatively more likely-to-occur, and relatively long codewords are formed to represent sequences of values that are relatively less likely-to-occur, and wherein in the case that the established breakpoint is such that the second region is a null region, all the quantized coefficients are encoded using the first region encoding method, and in the case that the established breakpoint is such that the first region is a null region, all the coefficients are encoded using the second region encoding method.

22. An apparatus including a processing system, the processing system including at least one processor and at least one storage element, the apparatus to accept a plurality of ordered series of quantized coefficients of blocks of an image, the coefficients having a most likely-to-occur amplitude of zero, the at least one storage element configured with executable instructions that when executed on the processing system, cause the apparatus to perform a method for processing the plurality of ordered series to reduce the amount of data used to represent the image and to form codewords such that the more likely-to-occur values or sequences of values of coefficients are represented by relatively short codewords and the less likely-to-occur values or sequences of values of coefficients are represented by relatively long codewords, the method comprising:

establishing a breakpoint along the ordering of the series to define a first contiguous region and a second contiguous region, such that clusters of consecutive non-zero-valued coefficients occur mostly in the first contiguous region, the establishing using statistics calculated from at least some of the ordered series of quantized coefficients, the statistics being of where, along the ordering of the plurality of the series non-zero-valued coefficients occur in clusters of consecutive non-zero-valued coefficients; and for each series in the plurality,
encoding the coefficients in the first region using a first region encoding method; and
means for encoding the coefficients in the second region using a second region encoding method, wherein the first region and second region encoding methods include variable length codes such that relatively short codewords are formed to represent sequences of values that are relatively more likely-to-occur, and relatively long codewords are formed to represent sequences of values that are relatively less likely-to-occur, and wherein the establishing of the breakpoint includes counting, for each point along the ordering, the number of series in which the coefficient at the point is in a cluster.

23. An apparatus as recited in claim 22,
wherein the establishing of the breakpoint includes determining a threshold point such that most coefficients that are in a cluster occur at a point prior to the threshold point, and searching for a near optimal breakpoint only up to the threshold point.

24. An apparatus as recited in claim 23,
wherein the threshold point is the particular point along the ordering where the count of the number of series that have a coefficient at the point falls below a pre-selected fraction of the total number of series.

25. An apparatus as recited in claim 23,
wherein the establishing of the breakpoint includes determining the point along the ordering up to the threshold point wherein the slope in the count of the number of non-zero coefficients that are in a cluster is maximum.

\* \* \* \* \*

UNITED STATES PATENT AND TRADEMARK OFFICE
CERTIFICATE OF CORRECTION

| | |
|---|---|
| PATENT NO. | : 7,471,841 B2 |
| APPLICATION NO. | : 11/069620 |
| DATED | : December 30, 2008 |
| INVENTOR(S) | : Wu et al. |

Page 1 of 1

It is certified that error appears in the above-identified patent and that said Letters Patent is hereby corrected as shown below:

In column 14, line 21, kindly replace "farther" with --further--

Signed and Sealed this

Twenty-fourth Day of March, 2009

JOHN DOLL
*Acting Director of the United States Patent and Trademark Office*